US009135270B2

(12) United States Patent
Goddard et al.

(10) Patent No.: US 9,135,270 B2
(45) Date of Patent: Sep. 15, 2015

(54) SERVER-CENTRIC VERSIONING VIRTUAL FILE SYSTEM

(75) Inventors: Denis Goddard, Concord, NH (US); Rahul Pandey, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1372 days.

(21) Appl. No.: 12/005,228

(22) Filed: Dec. 26, 2007

(65) Prior Publication Data
US 2009/0171971 A1 Jul. 2, 2009

(51) Int. Cl.
*G06F 17/30* (2006.01)

(52) U.S. Cl.
CPC ...... *G06F 17/3023* (2013.01); *G06F 17/30233* (2013.01)

(58) Field of Classification Search
CPC .................. G06F 17/30233; G06F 17/3023
USPC .......................................................... 707/827
See application file for complete search history.

(56) References Cited

U.S. PATENT DOCUMENTS

| 5,603,019 | A  | * | 2/1997  | Kish ........................... 1/1 |
| 6,356,863 | B1 | * | 3/2002  | Sayle .......................... 703/27 |
| 6,697,846 | B1 | * | 2/2004  | Soltis ......................... 709/217 |
| 7,085,768 | B2 | * | 8/2006  | Scott et al. ................. 1/1 |
| 7,174,360 | B2 | * | 2/2007  | Uemura et al. ............. 709/201 |
| 7,284,016 | B2 | * | 10/2007 | Venkatesh et al. ......... 1/1 |
| 2003/0145230 | A1 | * | 7/2003  | Chiu et al. .................. 713/201 |
| 2004/0019655 | A1 | * | 1/2004  | Uemura et al. ............. 709/217 |
| 2004/0133570 | A1 | * | 7/2004  | Soltis .......................... 707/3 |
| 2007/0179991 | A1 | * | 8/2007  | Burnett et al. ............. 707/201 |
| 2008/0294748 | A1 | * | 11/2008 | Brown et al. ............... 709/219 |

OTHER PUBLICATIONS

Oracle Intl. Corp., Oracle Technical White Paper; Using Oracle9i SCM for Software Configuration Mgmt.; Jul. 2002; pp. 1-17; Oracle Intl. Corp., Redwood Shores, CA.
Bersoff et al., Software Configuration Management/MEE,; Wikipedia; 1997; pp. 1-13; http://en.wikipedia.org/wiki/software_configuration_management/MEE.
Bersoff et al., Software Configuration Management/MEE,; Wikipedia; 1997; pp. 1-3; http://en.wikipedia.org/wiki/configuration_management.
Bersoff et al., Software Configuration Management/MEE,; Wikipedia; 1997; pp. 1-6; http://en.wikipedia.org/wikiconfiguration_management.
IBM, , IBM Rational ClearCase; Wikipedia; Nov. 2007; pp. 1-5 http://en.wikipedia.org/wiki/IBM_Rational_ClearCase.

(Continued)

*Primary Examiner* — Joshua Bullock
(74) *Attorney, Agent, or Firm* — Kraguljac Law Group, LLC

(57) ABSTRACT

Systems, methods, and other embodiments associated with a server-centric virtual file system (VFS) that securely provides version control for file system objects associated with the VFS are described. One example system includes a VFS logic to provide virtual access to file system objects associated with a server. The VFS logic may receive a file handle from an NFS server in response to a VFS mount request made by a client computing system. The example system may also include a version logic that encodes a workspace identifier and a file system object identifier into the provided file handle. The version logic then provides file-handle based version control for the set of file system objects.

21 Claims, 5 Drawing Sheets

(56) References Cited

OTHER PUBLICATIONS

IBM, , Rational ClearCase Change Management Solution; Nov. 2007; pp. 1-2 http://www-306.ibm.com/software/awdtools/changemgmt/features/index.html?S_CMP=r . . . .

IBM, , IBM Rational ClearCase; Rational Software; Mar. 2007; pp. 1-4 IBM Corporation; Somers, NY.

Perforce Software, Perforce 2007.2 Introducing Perforce; May 2007; pp. 1-26; Perforce Software.

* cited by examiner

SERVER-CENTRIC VERSIONING VIRTUAL FILE SYSTEM

BACKGROUND

A network file system (NFS) provides remote access to files in a file system. Thus, an NFS may allow a remote client to have what appears to be local access to files that do not reside at the client. The remote client may interact with a server (e.g., file server) that provides the NFS. Instead of physically copying files from a server to a client, an NFS may make the server-based files appear local to the remote client. To provide this network access, an NFS may interact with a number of standard and/or proprietary computing elements. For example, an NFS may interact with a standards-based network file system protocol. An NFS may be a client/server application that lets network users access shared files stored on different computers. The NFS may provide a file handle that encodes information concerning the actual physical location of the filesystem object for which the NFS is providing remote access.

An example standards-based NFS is the NFS developed by Sun Mircrosystems in the eighties and refined several times since. This NFS is a client/server model that implements a protocol for transparently providing clients remote access to shared files residing on a server. This NFS enables clients to use the files residing on the server as if they were residing on a locally mounted file system. Files are identified using file handles that store information that an NFS server uses to identify a file. A client that wishes to use a set of remote files located in a remote directly may mount the directory using, for example, a mount daemon (e.g., mountd) on the server. If the mount is authorized and completed, the client receives a root file handle. This file handle can be presented to an NFS daemon (e.g., nfsd) to access the remote objects in the export point. Some NFS implementations may incorporate the mounting process into the NFS server directly, and thus not require a separate mount daemon.

A virtual file system (VFS) is an abstraction layer that allows clients to access a file system in a standards-based way, independent of the actual physical implementation of that file system. For example, a VFS layer may present a standards-based Unix filesystem interface to client applications, for an underlying physical filesystem that is proprietary. A network file system may include a VFS layer to allow standards-based remote clients access to a proprietary file system implementation.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
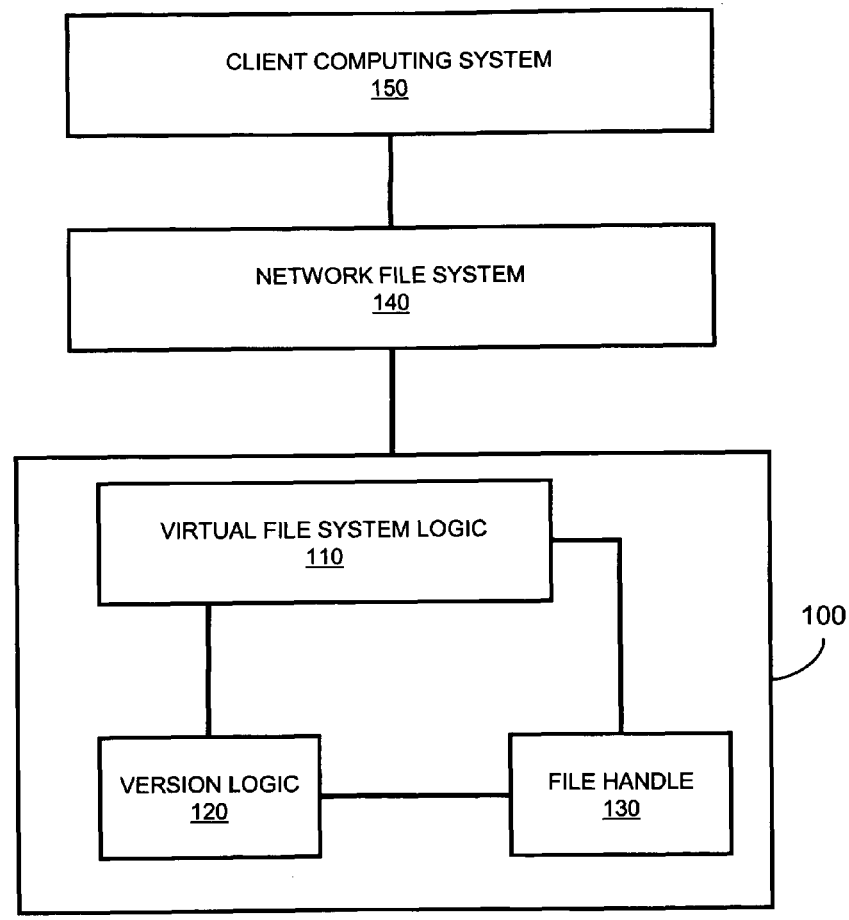
FIG. 1 illustrates an example server-centric versioning VFS.

Example systems and methods provide a versioning VFS. The versioning VFS may rely on a standards-based NFS to provide virtual access to files, and to provide version control for those files. The versioning VFS may be server-centric. Therefore, clients supporting the standards-based NFS may access the versioning VFS without installing additional computing components (e.g., propriety software). The NFS may provide a basic file handle that encodes information concerning the physical location of a file for which virtual access is being provided. The NFS may provide the basic file handle in response to a client mounting the versioning VFS. The versioning VFS may manipulate the basic file handle by encoding additional information used in versioning. For example, the versioning VFS may encode a work space identifier and a file system object identifier into the file handle. The work space identifier is associated with the client that mounts the versioning VFS. The file system object identifier is associated with the file system object touched by a client request. The file system object may be, for example, a file, a directory, a UNIX symbolic link, and so on. Thus, rather than provide limited though valuable virtual access using a conventional file handle, example systems and methods provide version control for files accessed through a VFS. The version control interacts with the additional information encoded in the file handle.

In one example, selecting a version of a file system object for which version control is provided by the versioning VFS may include taking three different types of actions based on a client request. In one example, a client may request a file. In this example, file handle information may be interpreted by a set of workspace rules to determine an appropriate version of a file system object to provide in response to the request. For example, the "most recent" version of a file, viewed in the context of the requesting workspace, may be returned.

In another example, a client may request a specific version of a file by adding file version syntax to a file name. For example, a user may request the $N^{th}$ version of the file named "sample_file" by adding a version indicator. In one example, the resulting file name may appear as sample_file@@/N, where the @@/N syntax identifies a version number. One skilled in the art will appreciate that different syntactic approaches are available to specify a version number, and that versions may require further components, such as branch names, in order to be uniquely identified. In this example, file handle information may also be interpreted, this time in light of the version indicator, to determine an appropriate version of a file system object to provide in response to the request.

In another example, a client may request a specific version of a file by adding file metadata syntax to a file name. For example, a user may request a version of the file named "sample_file" that was last touched by an author named "Jones" by adding a metadata indicator. In one example, the resulting file name may appear as sample_file~author.Jones. The ~author.XXXX syntax may identify the metadata attribute upon which a decision is to be made and a value for that attribute. One skilled in the art will appreciate that different syntactic approaches are available to specify metadata attributes and/or their values. One skilled in the art will also appreciate that a file system object may have different types of metadata attributes including, for example, an author, a first touched date, a most recently touched date, a size, an encoding, arbitrary end-user specified attributes, and so on. In this example, file handle information may also be interpreted, this time in light of the metadata indicator, to determine an appropriate version of a file system object to provide in response to the request.

This paragraph describes a "file handle". An NFS server uniquely identifies a file in its file system using a file handle. When an NFS client performs an operation, it passes the file handle to the server. The NFS server then decodes the file handle to determine to what object the file handle refers. NFS is a stateless protocol. Thus, a client may present a file handle to an NFS server at undetermined points in the future. The file handles described herein are persistent file handles. In one example, a file handle includes a file system identifier, a device number, and an inode number. A file handle provided by an NFS may be manipulated. In this application the manipulation includes either adding additional data to the standard NFS file handle and/or repurposing existing data in the standard NFS file handle.

DEFINITIONS

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD-recordable.
CD-RW: CD-rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable computer or processor instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers, other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

FIG. 1 illustrates a system 100 that provides server-centric versioning in a VFS. System 100 includes a VFS logic 110 that provides virtual access to a set of file system objects associated with a server computing system. The set of file system objects may include, for example, a file, a directory, a symbolic link, and so on. The virtual access is provided to a user associated with a client computing system 150. The user may mount the VFS using functionality provided by an NFS 140. For example, a mountd daemon in NFS 140 may be employed to mount the VFS at a specific mount point. When the VFS is mounted, the NFS 140 provides a file handle 130. While a mountd daemon is described, it is to be appreciated that other mount approaches may be employed with different instances of an NFS.

Neither the user, the workspace, nor the file system object exist in a logical or physical vacuum. In fact, a user is associated with a workspace and thus a version of a file system object (e.g., file) may be treated differently depending on user/workspace information. Thus, the system 100 includes a version logic 120 to encode a workspace identifier into the file handle provided by the NFS to facilitate such differential user/workspace treatment. The version logic 120 also encodes a file system object identifier into the provided file handle 130. The workspace identifier uniquely identifies a combination of a user and a workspace and the file system object identifier uniquely identifies a file system object. Thus, rather than merely having the useful, but limited, standard file handle provided by the NFS, a file handle 130 with additional information is processed by system 100. Thus, the version logic 120 may provide version control for the set of file system objects where version decisions are based, at least in part, on the file handle 130.

In one example, the VFS logic 110 is incorporated into the server computing system. Thus, the client computing system 150 may interact with the system 100 using standards-based, non-proprietary NFS infrastructure provided in a standard NFS client.

Figure 2:
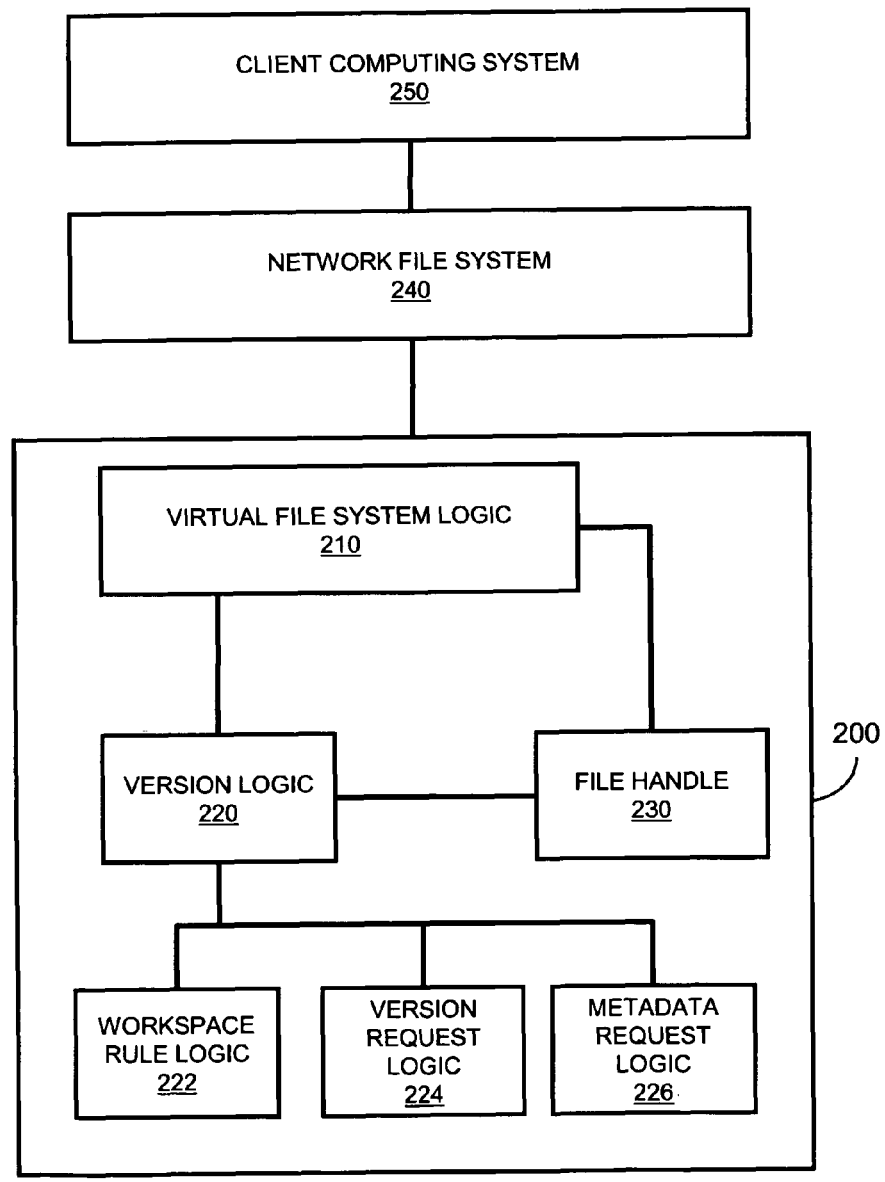
FIG. 2 illustrates an example server-centric versioning VFS.

FIG. 2 illustrates a system 200 that includes several elements similar to those described in association with system 100 (FIG. 1). For example, system 200 includes a VFS logic 210 and a version logic 220 that process a file handle 230 and that interact with a client computing system 250 through a network file system 240. However, system 200 further characterizes version control processing associated with the version logic 220.

In one example, the version logic 220 includes a workspace rule logic 222 that provides file-handle based version control. This control may be based, at least in part, on an ordered set of rules specific to a workplace. Recall that file handle 230 includes a workspace identifier. Therefore, when a request for a certain file system object is received by system 200, version logic 220 may, selectively, through workspace rule logic 222 evaluate members of the ordered set of rules. These members may be evaluated in light of the file handle that includes the workspace identifier and the file system object identifier. The rules may control which version of a file system object is provided in response to a request from the client computing system, where the version decision depends on the additional information in the file handle 230. For example, a file may have been accessed by several users, some of whom may have edited the file and some of whom may not. Furthermore, some of the edits may be "private" edits (e.g., comments) that are intended only for a certain user or set of users. Thus, a first user may ask for the file and may receive a first version based on their history, privileges, usage rights, and so on. However, a second user may ask for the file and may receive a second version based on their history, privileges and so on. This type of differential, secure version control is facilitated by encoding the workspace identifier and the file system object identifier into file handle 230.

In one example, version logic 220 includes a version request logic 224 that provides file-handle based version control. This control may be based, at least in part, on version syntax associated with a file system object name. For example, a file name may include extra characters that identify that a specific version is desired. The specific version may be, for example, a first version, a most recent version, an Nth version (N being an integer greater than 0), and so on. The version syntax may be evaluated in light of the file handle 230 that includes the workspace identifier and the file system object identifier. In one example, the version request logic 224 and the workspace rule logic 222 may operate exclusive of each other while in another example the version request logic 224 and the workspace rule logic 222 may cooperate.

In one example, version logic 220 includes a metadata request logic 226 that provides file-handle based version control. This control may be based, at least in part, on metadata syntax associated with a file system object name. For example, a file name may be decorated with extra characters that identify that a specific version is desired. The specific version may be associated with metadata attributes including, for example, author, touched date, edited date, created date, and so on. The metadata syntax may be evaluated in light of the file handle 230 that includes the workspace identifier and the file system object identifier. In one example, the metadata request logic 226 may operate independently from either workspace rule logic 222 and/or version request logic 224 while in another example the metadata request logic 226 may cooperate with one or both of the workspace rule logic 222 and/or the version request logic 224.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
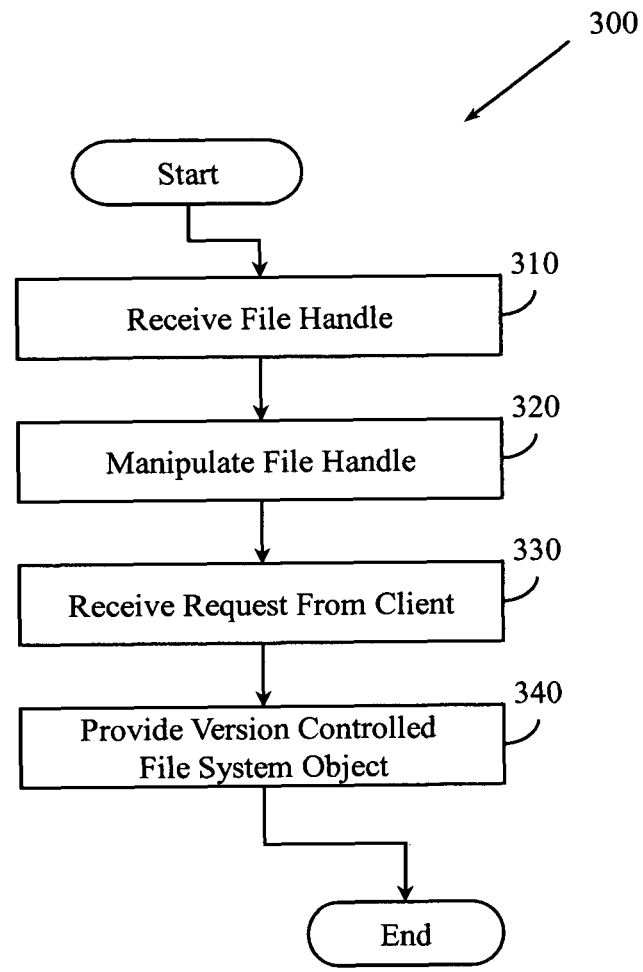
FIG. 3 illustrates a method associated with a server-centric versioning VFS.

FIG. 3 illustrates a method 300 for providing a server-centric versioning VFS. Method 300 includes, at 310, receiving a file handle in response to a VFS being mounted. The VFS may be mounted in response to an NFS action initiated by a user of a client computing system. In one example, the received file handle may be substantially similar to a file handle provided by a standards-based, non-proprietary NFS server. In one example, the received file handle may be an NFS file handle described in accordance with one or more of RFC 1094, RFC 1813, RFC 354, and RFC 3530.

Method 300 also includes, at 320, manipulating the file handle to include a workspace identifier and a file system object identifier. In one example, manipulating the file handle includes adding additional fields to the file handle and then populating those fields. In another example, manipulating the file handle includes repurposing existing fields in the file handle and then changing values in the repurposed fields. The workspace identifier identifies a combination of the user and the client computing system while the file system object identifier identifies a file system object accessible through the VFS.

Method 300 also includes, at 330, receiving a request from the user of the client computing system. The request may be for a file system object accessible through the VFS. In one example, receiving the request includes receiving an NFS client-side request from a standards-based, non-proprietary NFS client. Method 300 provides version control for file system objects accessed through the VFS. Therefore, a decision may be made about which version of a file system object to provide in response to the request.

Therefore, method 300 also includes, at 340, providing a version of the file system object. If there are multiple versions, then the version that is provided may be selected based, at least in part, on the file handle that includes the workspace identifier and the file system object identifier. The file handle may include information upon which a version control decision can be made. For example, a first user may be entitled to see a "most recent" version of a file while a second user may only be entitled to see an "original" version of a file. In another example, one user may be entitled to see a "complete" version of a file while another user may only be entitled to see a "partial" version of a file. Thus, which version is provided at 340 may be related to the workspace identifier.

While FIG. 3 illustrates various actions occurring in serial, it is to be appreciated that various actions illustrated in FIG. 3 could occur substantially in parallel. By way of illustration, a first process could receive file handles, a second process could manipulate file handles, a third process could receive client requests and a fourth process could provide a version controlled file system object. While four processes are described, it is to be appreciated that a greater and/or lesser number of processes could be employed and that lightweight processes, regular processes, threads, and other approaches could be employed.

In one example, a method may be implemented as processor executable instructions. Thus, in one example, a computer-readable medium may store processor executable instructions that if executed by a machine (e.g., processor) cause the machine to perform method 300. While computer-executable instructions associated with method 300 are described being stored on a computer-readable medium, it is to be appreciated that computer-executable instructions associated with other example methods described herein (e.g., method 400) may also be stored on a computer-readable medium.

Figure 4:
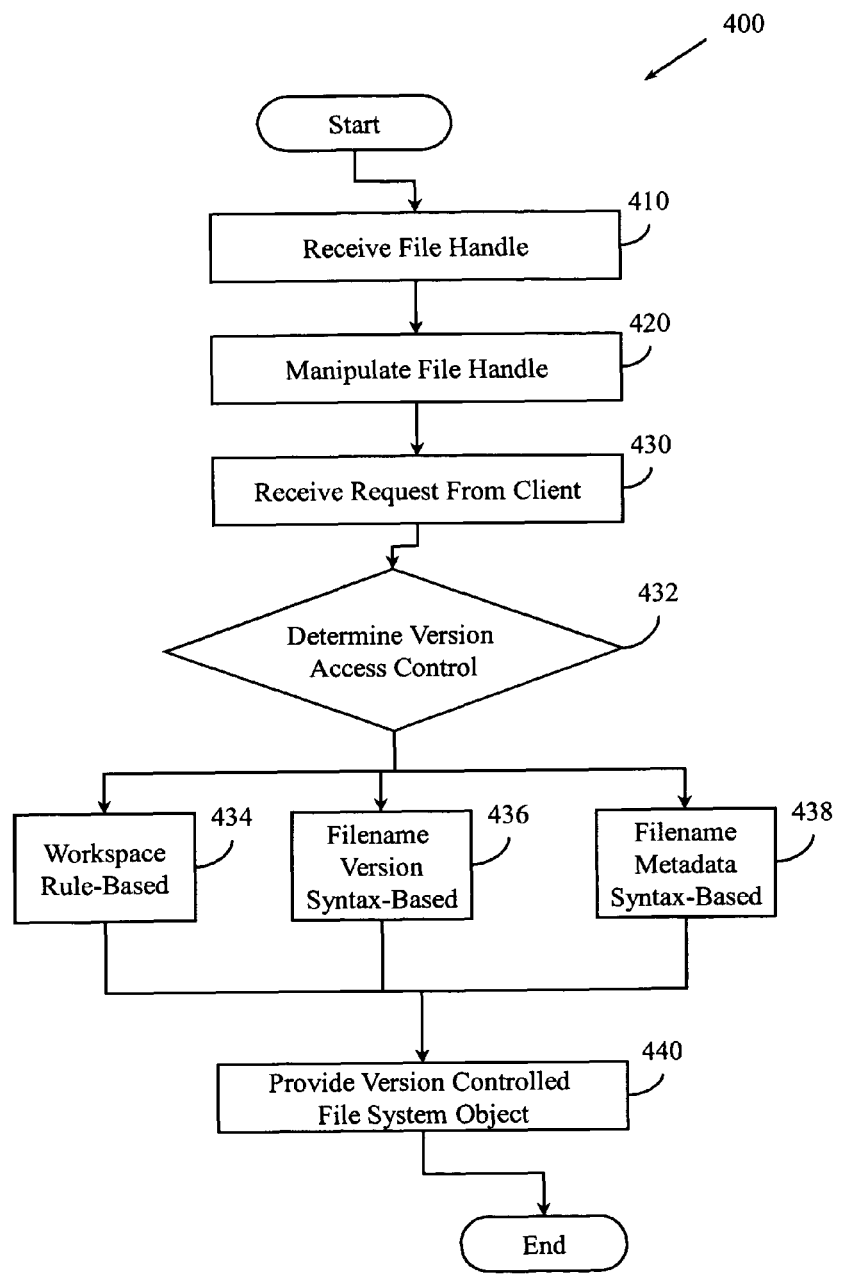
FIG. 4 illustrates a method associated with a server-centric versioning VFS.

FIG. 4 illustrates a method 400 that includes several actions similar to those described in connection with method 300 (FIG. 3). For example, method 400 includes, at 410, receiving a file handle and, at 420, manipulating the file handle to include additional information (e.g., workspace identifier, file system object identifier). Similarly, method 400 includes, at 430, receiving a request from a client and, at 440, providing a version controlled file system object in response to the request. However, method 400 performs additional processing.

For example, method 400 determines, at 432, what type of version access control to apply. The determination may be based, for example, on whether a requested file includes extra syntax that identifies versioning information. In one example, the determination may be made to perform workspace rule-based version control at 434. In this example, the file system object returned at 440 in response to the request at 430 may satisfy a member(s) of an ordered set of rules specific to a workspace associated with the workspace identifier. The rules may identify which version(s) of a file a user associated with a specific workspace is entitled to receive and should receive.

In one example, the determination may be made to perform filename version syntax-based version control at 436. In this example, the file system object returned at 440 may be determined by examining version qualifying syntax associated with a file name provided in the request. This syntax may specify that a first version, a last version, an immediately previous version, an Nth version (N being an integer greater than zero), and so on, is to be returned. The filename version syntax-based processing at 436 may select a version based on this syntax. While a user may request the Nth version of a file, the processing at 436 may provide a different version based, for example, on permissions, conflicts, and so on.

In one example, the determination may be made to perform filename metadata syntax-based version control at 438. In this example, the file system object returned at 440 may be determined by examining metadata qualifying syntax associated with a file name provided in the request. This syntax may specify that a version associated with a specific author, that a version created before a certain date, that a version edited after a certain date, and so on, is to be returned. The filename metadata syntax-based processing at 438 may select a version based on this syntax. While a user may request a version associated with a certain author, the processing at 438 may provide a different version based, for example, on security reasons.

While three separate paths are illustrated going forward from the determination made at 432, it is to be appreciated that processing performed at 434, 436, and 438 may be performed in a complementary manner. Thus, a user may specific version syntax and/or metadata syntax and may still have the version selected based on rules applicable to the specific workspace associated with the request. Similarly, in one example, a request for a file may include both version syntax and metadata syntax and thus multiple paths forward from 432 may be taken.

Figure 5:
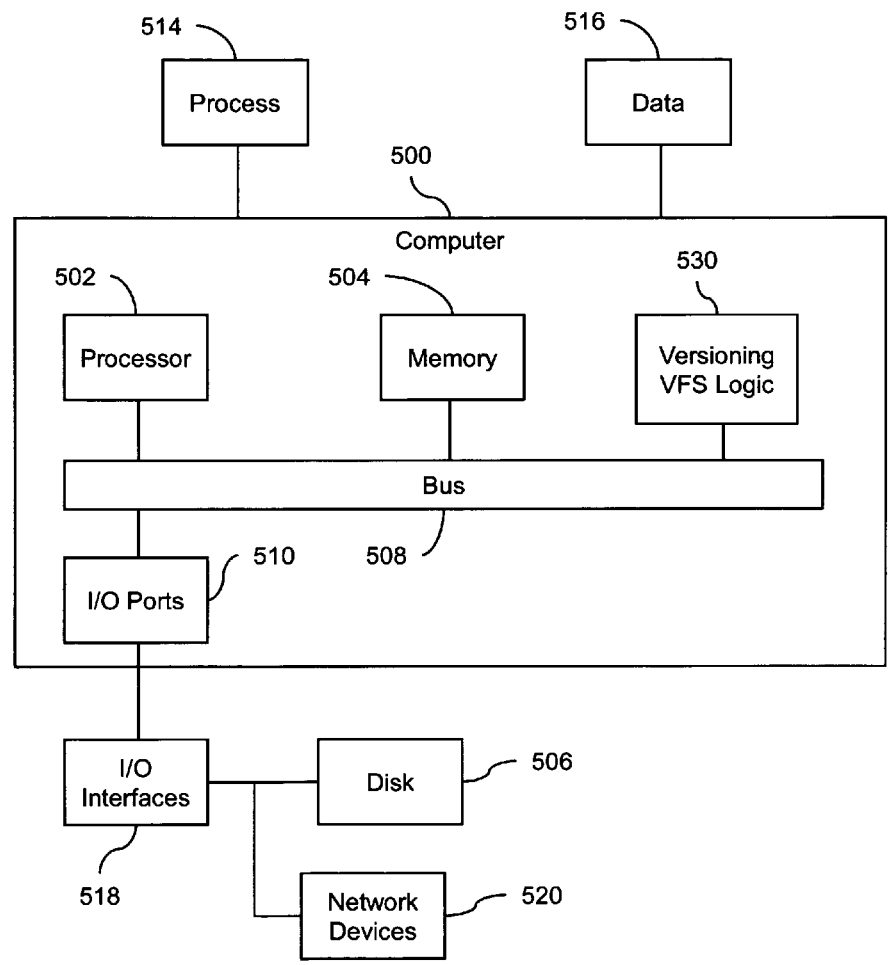
FIG. 5 illustrates an example computing environment in which example systems and methods described herein can operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a versioning VFS logic 530 configured to facilitate providing server-centric version control for file system objects accessed through a VFS. In different examples, the logic 530 may be implemented in hardware, software, firmware, and/or combinations thereof. While the logic 530 is illustrated as a hardware component attached to the bus 508, it is to be appreciated that in one example, the logic 530 could be implemented in the processor 502.

Logic 530 may provide means (e.g., hardware, software, firmware) for manipulating an NFS file handle to include a workspace identifier and a file system object identifier. The means may be implemented, for example, as an ASIC programmed to input a standard file handle and to output a file handle with additional fields and/or with repurposed fields. The means may also be implemented, for example, as processor executable instructions that can be temporarily stored as a process 514, brought into memory 504, and executed by processor 502. Logic 530 may also provide means (e.g., hardware, software, firmware) for selecting a version of a file system object requested through the VFS. The selecting may be based, at least in part, on the NFS file handle that includes the workspace identifier and the file system object identifier.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
    a virtual file system (VFS) logic to provide access to a set of versions of a file associated with a server computing system, the set of versions of the file being provided to a user of a client computing system that mounts a virtual file system (VFS) using a network file system (NFS), the user being associated with a workspace; and
    a version logic to encode a file handle that includes at least a file name by adding a workspace identifier and a file identifier into the file handle, where the file handle is provided by the NFS to the client computing system in response to the user mounting the VFS in the client computing system, and where the version logic provides a version of the file from the set of versions of the file.

2. The system of claim 1, where the version logic is configured to provide the version from the set of versions of the file based, at least in part, on the workspace identifier and the file identifier.

3. The system of claim 1, where the VFS logic is incorporated into the server computing system.

4. The system of claim 1, where the workspace identifier uniquely identifies a combination of the user and the workspace.

5. The system of claim 1, where the file identifier uniquely identifies a version of the file in the set of versions of the files.

6. The system of claim 1, where the version logic includes a workspace rule logic to provide file-handle based version control based, at least in part, on an ordered set of rules specific to a workspace, where members of the ordered set of rules are evaluated in light of the file handle that includes the workspace identifier and the file identifier.

7. The system of claim 6, where the version logic includes a version request logic to provide file-handle based version control based, at least in part, on version syntax associated with a file name, where the version syntax is evaluated in light of the file handle that includes the workspace identifier and the file identifier.

8. The system of claim 7, where the version logic includes a metadata request logic to provide file-handle based version control based, at least in part, on metadata syntax associated with a file name, where the metadata syntax is evaluated in light of the file handle that includes the workspace identifier and the file identifier.

9. The system of claim 1, where the client computing system receives version controlled files while accessing the VFS using standard NFS client-side software.

10. A non-transitory computer-readable medium storing computer-executable instructions that when executed by a computer cause the computer to perform associated actions, the computer-executable instructions comprising instructions for:
  receiving a file handle that includes at least a file name, in response to a virtual file system (VFS) being mounted and a network file system (NFS) action initiated by a user of a client computing system;
  manipulating the file handle by adding a workspace identifier and a file system object identifier onto the file name in the file handle, where the workspace identifier identifies a combination of the user and the client computing system and where the file system object identifier identifies a file system object accessible through the VFS;
  receiving a request from the user of the client computing system for a file system object accessible through the VFS; and
  providing a version of the file system object that is selected based, at least in part, on the workspace identifier and the file system object identifier from the file handle, where providing the version of the file system object includes providing the version from a set of versions of the file system object.

11. The non-transitory computer-readable medium of claim 10, the file handle being associated with a standards-based, non-proprietary NFS server.

12. The non-transitory computer-readable medium of claim 11:
  where manipulating the file handle to include the workspace identifier and the file system object identifier includes encoding the file handle with the workspace identifier and the file system object identifier;
  where receiving the request from the user of the client computing system for a file system object accessible through the VFS includes receiving an NFS client-side request from a standards-based, non-proprietary NFS client;
  where the file system object is selected based, at least in part, on one or more of:
    an ordered set of rules specific to a workspace associated with the workspace identifier;
    version qualifying syntax associated with a file name provided in the request; and
    metadata qualifying syntax associated with a file name provided in the request.

13. The non-transitory computer-readable medium of claim 11:
  where manipulating the file handle to include the workspace identifier and the file system object identifier includes encoding a file system object not under version control.

14. The non-transitory computer-readable medium of claim 10, where manipulating the file handle to include the workspace identifier and the file system object identifier includes encoding the file handle with the workspace identifier and the file system object identifier.

15. The non-transitory computer-readable medium of claim 10, where receiving the request from the user of the client computing system for a file system object accessible through the VFS includes receiving an NFS client-side request from a standards-based, non-proprietary NFS client.

16. The non-transitory computer-readable medium of claim 10, where the file system object is selected based, at least in part, on analyzing an ordered set of rules specific to a workspace associated with the workspace identifier.

17. The non-transitory computer-readable medium of claim 16, where the file system object is selected based, at least in part, on version qualifying syntax associated with a file name provided in the request.

18. The non-transitory computer-readable medium of claim 17, where the file system object is selected based, at least in part, on metadata qualifying syntax associated with a file name provided in the request.

19. The non-transitory computer-readable medium of claim 18, where the metadata qualifying syntax identifies one or more of, an author, a creation date, an updated date, a touched date, a file type, a file size, and a user-definable attribute.

20. The non-transitory computer-readable medium of claim 17, where the version qualifying syntax identifies an Nth version, N being an integer greater than zero, where versions are organized into one or more branches.

21. A system to facilitate providing version control for file system objects accessed through a virtual file system VFS, comprising:
  a non-transitory computer-readable medium that comprises means for manipulating a network file system (NFS) file handle, which includes at least a file name, by inserting a workspace identifier and a file system object identifier into the NFS file handle; and
  means for selecting a version of a file system object from a set of versions of the file system object requested through the VFS where the selecting is based, at least in part, on the workspace identifier and the file system object identifier from the NFS file handle.

* * * * *